(12) United States Patent
Yan et al.

(10) Patent No.: US 11,153,137 B2
(45) Date of Patent: Oct. 19, 2021

(54) FEEDBACK MESSAGE HAVING A SEQUENCE INDICATING FEEDBACK INFORMATION CORRESPONDING TO DATA BLOCKS

(71) Applicant: Lenovo (Beijing) Limited, Beijing (CN)

(72) Inventors: Zhi Yan, Beijing (CN); Haipeng Lei, Beijing (CN); Xiaodong Yu, Beijing (CN); Yingying Li, Beijing (CN); Chenxi Zhu, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 0 days.

(21) Appl. No.: 16/651,487

(22) PCT Filed: Sep. 29, 2017

(86) PCT No.: PCT/CN2017/104343
§ 371 (c)(1),
(2) Date: Mar. 27, 2020

(87) PCT Pub. No.: WO2019/061277
PCT Pub. Date: Apr. 4, 2019

(65) Prior Publication Data
US 2020/0267033 A1     Aug. 20, 2020

(51) Int. Cl.
*H04L 27/20* (2006.01)
*H04L 1/16* (2006.01)
(Continued)

(52) U.S. Cl.
CPC ........ *H04L 27/2082* (2013.01); *H04L 1/1671* (2013.01); *H04L 1/1858* (2013.01);
(Continued)

(58) Field of Classification Search
None
See application file for complete search history.

(56) References Cited

U.S. PATENT DOCUMENTS

| 2009/0119712 | A1* | 5/2009 | Kim | ........................ | H04N 21/47 |
| | | | | | 725/40 |
| 2013/0086612 | A1* | 4/2013 | Kim | ................ | H04N 21/47214 |
| | | | | | 725/40 |

(Continued)

FOREIGN PATENT DOCUMENTS

| CN | 102904698 | A | * | 1/2013 | |
| CN | 103188061 | A | * | 7/2013 | ........... H04L 1/1861 |

(Continued)

OTHER PUBLICATIONS

PCT/CN2017/104343, "International Search Report and the Written Opinion of the International Search Authority", PCT International Search Authority/China, State Intellectual Property Office of the P.R. China, Jun. 22, 2018, pp. 1-6.
(Continued)

*Primary Examiner* — Berhanu Tadese
(74) *Attorney, Agent, or Firm* — Kunzler Bean & Adamson

(57) ABSTRACT

Apparatuses, methods, and systems are disclosed for transmitting and/or receiving feedback. One apparatus (300) includes a transmitter (310) that transmits (802) multiple data blocks. The apparatus (300) includes a receiver (312) that receives (804) a feedback message in a time slot. The feedback message corresponds to the multiple data blocks. The feedback message includes one or more sequences that indicate feedback information, wherein the feedback information corresponds to the multiple data blocks. The feedback message includes: a sequence of a sequence set; multiple sequences of a sequence set, wherein each sequence of the multiple sequences indicates feedback information; a
(Continued)

sequence of a sequence set in a physical resource of a physical resource set, wherein the sequence and the physical resource indicate feedback information; and/or multiple sequences of a sequence set in a physical resource of a physical resource set, wherein the multiple sequences and the physical resource indicate feedback information.

16 Claims, 7 Drawing Sheets

(51) Int. Cl.
    H04L 1/18      (2006.01)
    H04L 27/00     (2006.01)
    H04L 27/10     (2006.01)
(52) U.S. Cl.
    CPC .......... *H04L 27/0014* (2013.01); *H04L 27/10* (2013.01); *H04L 2027/002* (2013.01)

(56) References Cited

U.S. PATENT DOCUMENTS

| | | | | |
|---|---|---|---|---|
| 2014/0064240 A1* | 3/2014 | Dinan | H04L 5/0023 | 370/330 |
| 2016/0226630 A1* | 8/2016 | Zhang | H04L 1/1861 | |
| 2016/0249198 A1* | 8/2016 | Kim | H04W 72/04 | |
| 2016/0269887 A1* | 9/2016 | Kim | H04W 8/005 | |
| 2016/0294519 A1* | 10/2016 | Kim | H04L 5/0035 | |
| 2016/0337089 A1* | 11/2016 | Chen | H04L 1/1861 | |
| 2016/0353478 A1* | 12/2016 | Kim | H04W 72/12 | |
| 2017/0012753 A1* | 1/2017 | Kim | H04W 56/002 | |
| 2017/0013628 A1* | 1/2017 | Kim | H04W 56/002 | |
| 2017/0019937 A1* | 1/2017 | Kim | H04W 76/11 | |
| 2017/0041971 A1* | 2/2017 | Kim | H04W 72/12 | |
| 2017/0171865 A1* | 6/2017 | Hwang | H04L 5/00 | |
| 2017/0187563 A1* | 6/2017 | Shin | H04L 27/2656 | |
| 2017/0265155 A1* | 9/2017 | Kim | H04W 56/001 | |
| 2018/0139586 A1* | 5/2018 | Park | H04W 4/06 | |
| 2018/0146491 A1* | 5/2018 | Kim | H04W 28/0268 | |
| 2018/0176891 A1* | 6/2018 | Kim | H04W 24/08 | |
| 2018/0213549 A1* | 7/2018 | Kim | H04L 1/00 | |
| 2018/0242367 A1* | 8/2018 | Kim | H04L 5/001 | |
| 2018/0255542 A1* | 9/2018 | Seo | H04L 5/0053 | |
| 2018/0270722 A1* | 9/2018 | Kim | H04W 36/0072 | |
| 2018/0323830 A1* | 11/2018 | Park | H04B 7/024 | |
| 2018/0368169 A1* | 12/2018 | Jung | H04W 72/0413 | |
| 2019/0036746 A1* | 1/2019 | Hwang | H04L 27/3444 | |
| 2019/0037555 A1* | 1/2019 | Kim | H04W 72/0413 | |
| 2019/0074935 A1* | 3/2019 | Babaei | H04W 72/0453 | |
| 2019/0103951 A1* | 4/2019 | Park | H04L 1/0061 | |
| 2019/0116608 A1* | 4/2019 | Kim | H04W 72/1263 | |
| 2019/0123881 A1* | 4/2019 | Lee | H04L 5/0057 | |
| 2019/0150187 A1* | 5/2019 | Park | H04W 72/1273 | 370/330 |
| 2019/0174384 A1* | 6/2019 | Kim | H04W 36/0069 | |
| 2019/0222359 A1* | 7/2019 | Yan | H04L 1/1861 | |
| 2019/0313437 A1* | 10/2019 | Jung | H04L 5/0042 | |
| 2019/0327012 A1* | 10/2019 | Park | H04W 76/11 | |
| 2019/0349867 A1* | 11/2019 | MolavianJazi | H04W 52/40 | |
| 2020/0059868 A1* | 2/2020 | Yang | H04W 52/367 | |
| 2020/0112466 A1* | 4/2020 | Yang | H04L 27/2613 | |
| 2020/0119799 A1* | 4/2020 | Jung | H04B 7/088 | |
| 2020/0154496 A1* | 5/2020 | Yl | H04W 72/10 | |
| 2020/0187165 A1* | 6/2020 | Park | H04L 1/1671 | |
| 2020/0236524 A1* | 7/2020 | Ye | H04W 24/08 | |
| 2020/0280985 A1* | 9/2020 | Ijaz | H04W 72/0413 | |

FOREIGN PATENT DOCUMENTS

| | | | | | |
|---|---|---|---|---|---|
| CN | 103684705 A | * | 3/2014 | ......... | H04L 1/1812 |
| CN | 102904698 B | * | 6/2017 | | |
| EP | 2381716 A1 | | 10/2011 | | |
| JP | 2016105173 A | * | 6/2016 | ......... | G09G 3/3258 |
| WO | 2012130095 A1 | | 10/2012 | | |
| WO | WO-2016105173 A1 | * | 6/2016 | ......... | H04L 1/1893 |
| WO | WO-2017030489 A1 | * | 2/2017 | ......... | H04L 1/1861 |
| WO | WO-2019028844 A1 | * | 2/2019 | ......... | H04L 1/1896 |
| WO | WO-2019028845 A1 | * | 2/2019 | ......... | H04L 5/0055 |
| WO | WO-2019061277 A1 | * | 4/2019 | ......... | H04L 27/0014 |
| WO | WO-2019094437 A1 | * | 5/2019 | ......... | H04L 5/0055 |

OTHER PUBLICATIONS

Motorola, "PUCCH resource allocation for HARQ-ACK feedback to Msg4", R1-1711283, 3GPP TSG RAN WG1 NR Ad-Hoc#2, Jun. 27-30, 2017, pp. 1-4.

* cited by examiner

FEEDBACK MESSAGE HAVING A SEQUENCE INDICATING FEEDBACK INFORMATION CORRESPONDING TO DATA BLOCKS

FIELD

The subject matter disclosed herein relates generally to wireless communications and more particularly relates to feedback bundling and multiplexing in feedback messages.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FEE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Link Failure ("RLF"), Radio Network Temporary Identifier ("RNTI"), Reference Signal ("RS"), Remaining Minimum System Information ("RMSI"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UB"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, feedback may be transmitted in response to receiving data. Especially for a TDD configuration, feedback may have insufficient resources.

BRIEF SUMMARY

Methods for receiving feedback are disclosed. Apparatuses and systems also perform the functions of the method. In one embodiment, the method includes transmitting multiple data blocks. In certain embodiments, the method includes receiving a feedback message in a time slot. In such embodiments, the feedback message corresponds to the multiple data blocks. In various embodiments, the feedback message includes: a sequence of a sequence set, wherein the sequence indicates feedback information, and the feedback information corresponds to the multiple data blocks; multiple sequences of a sequence set, wherein each sequence of the multiple sequences indicates feedback information, and the feedback information corresponds to one data block of the multiple data blocks; a sequence of a sequence set in a physical resource of a physical resource set, wherein the sequence and the physical resource indicate feedback information, and the feedback information corresponds to the multiple data blocks; multiple sequences of a sequence set in a physical resource of a physical resource set, wherein the multiple sequences and the physical resource indicate feedback information, and the feedback information corresponds to the multiple data blocks; or some combination thereof.

In one embodiment, the feedback message includes a sequence of a sequence set, the sequence indicates feedback information, and the feedback information corresponds to the multiple data blocks. In a further embodiment, the sequence set is selected from a group including a binary phase shift keying sequence set, a quadrature phase shift keying sequence set, and a Hadamard sequence set. In certain embodiments, receiving the feedback message includes receiving the feedback message via a single frequency tone, a single frequency pattern, a single frequency waveform, or some combination thereof.

In some embodiments, the feedback message includes multiple sequences of a sequence set, each sequence of the multiple sequences indicates feedback information, and the feedback information corresponds to one data block of the multiple data blocks. In various embodiments, the sequence set is selected from a group including a binary phase shift keying sequence set, a quadrature phase shift keying sequence set, and a Hadamard sequence set. In certain embodiments, receiving the feedback message includes receiving the feedback message via multiple frequency tones, multiple frequency patterns, multiple frequency waveforms, or some combination thereof.

In one embodiment, the feedback message includes a sequence of a sequence set in a physical resource of a physical resource set, the sequence and the physical resource indicate feedback information, and the feedback information corresponds to the multiple data blocks. In a further embodiment, the sequence set is selected from a group including a binary phase shift keying sequence set, a quadrature phase shift keying sequence set, and a Hadamard sequence set. In certain embodiments, receiving the feedback message includes receiving the feedback message via a single frequency tone, a single frequency pattern, a single frequency waveform, or some combination thereof.

In some embodiments, the feedback message includes multiple sequences of a sequence set in a physical resource of a physical resource set, the multiple sequences and the physical resource indicate feedback information, and the feedback information corresponds to the multiple data blocks. In various embodiments, the sequence set is selected from a group including a binary phase shift keying sequence set, a quadrature phase shift keying sequence set, and a Hadamard sequence set. In certain embodiments, receiving the feedback message includes receiving the feedback message via multiple frequency tones, multiple frequency patterns, multiple frequency waveforms, or some combination thereof.

An apparatus for receiving feedback, in one embodiment, includes a transmitter that transmits multiple data blocks. In certain embodiments, the apparatus includes a receiver that receives a feedback message in a time slot. In such embodiments, the feedback message corresponds to the multiple data blocks. In various embodiments, the feedback message includes: a sequence of a sequence set, wherein the sequence indicates feedback information, and the feedback information corresponds to the multiple data blocks; multiple sequences of a sequence set, wherein each sequence of the multiple sequences indicates feedback information, and the feedback information corresponds to one data block of the multiple data blocks; a sequence of a sequence set in a physical resource of a physical resource set, wherein the sequence and the physical resource indicate feedback information, and the feedback information corresponds to the multiple data blocks; multiple sequences of a sequence set in a physical resource of a physical resource set, wherein the multiple sequences and the physical resource indicate feedback information, and the feedback information corresponds to the multiple data blocks; or some combination thereof.

One method for transmitting feedback includes receiving multiple data blocks. In certain embodiments, the method includes transmitting a feedback message in a time slot. In such embodiments, the feedback message corresponds to the multiple data blocks. In various embodiments, the feedback message includes: a sequence of a sequence set, wherein the sequence indicates feedback information, and the feedback information corresponds to the multiple data blocks; multiple sequences of a sequence set, wherein each sequence of the multiple sequences indicates feedback information, and the feedback information corresponds to one data block of the multiple data blocks; a sequence of a sequence set in a physical resource of a physical resource set, wherein the sequence and the physical resource indicate feedback information, and the feedback information corresponds to the multiple data blocks; multiple sequences of a sequence set in a physical resource of a physical resource set, wherein the multiple sequences and the physical resource indicate feedback information, and the feedback information corresponds to the multiple data blocks; or some combination thereof.

In one embodiment, the feedback message includes a sequence of a sequence set, the sequence indicates feedback information, and the feedback information corresponds to the multiple data blocks. In a further embodiment, the sequence set is selected from a group including a binary phase shift keying sequence set, a quadrature phase shift keying sequence set, and a Hadamard sequence set. In certain embodiments, transmitting the feedback message includes transmitting the feedback message via a single frequency tone, a single frequency pattern, a single frequency waveform, or some combination thereof.

In some embodiments, the feedback message includes multiple sequences of a sequence set, each sequence of the multiple sequences indicates feedback information, and the feedback information corresponds to one data block of the multiple data blocks. In various embodiments, the sequence set is selected from a group including a binary phase shift keying sequence set, a quadrature phase shift keying sequence set, and a Hadamard sequence set. In certain embodiments, transmitting the feedback message includes transmitting the feedback message via multiple frequency tones, multiple frequency patterns, multiple frequency waveforms, or some combination thereof.

In one embodiment, the feedback message includes a sequence of a sequence set in a physical resource of a physical resource set, the sequence and the physical resource indicate feedback information, and the feedback information corresponds to the multiple data blocks. In a further embodiment, the sequence set is selected from a group including a binary phase shift keying sequence set, a quadrature phase shift keying sequence set, and a Hadamard sequence set. In certain embodiments, transmitting the feedback message includes transmitting the feedback message via a single frequency tone, a single frequency pattern, a single frequency waveform, or some combination thereof.

In some embodiments, the feedback message includes multiple sequences of a sequence set in a physical resource of a physical resource set, the multiple sequences and the physical resource indicate feedback information, and the feedback information corresponds to the multiple data blocks. In various embodiments, the sequence set is selected from a group including a binary phase shift keying sequence set, a quadrature phase shift keying sequence set, and a Hadamard sequence set. In certain embodiments, transmitting the feedback message includes transmitting the feedback message via multiple frequency tones, multiple frequency patterns, multiple frequency waveforms, or some combination thereof.

An apparatus for transmitting feedback, in one embodiment, includes a receiver that receives multiple data blocks. In certain embodiments, the apparatus includes a transmitter that transmits a feedback message in a time slot. In such embodiments, the feedback message corresponds to the multiple data blocks. In various embodiments, the feedback message includes: a sequence of a sequence set, wherein the sequence indicates feedback information, and the feedback information corresponds to the multiple data blocks; multiple sequences of a sequence set, wherein each sequence of the multiple sequences indicates feedback information, and the feedback information corresponds to one data block of the multiple data blocks; a sequence of a sequence set in a physical resource of a physical resource set, wherein the sequence and the physical resource indicate feedback information, and the feedback information corresponds to the multiple data blocks; multiple sequences of a sequence set in a physical resource of a physical resource set, wherein the multiple sequences and the physical resource indicate feedback information, and the feedback information corresponds to the multiple data blocks; or some combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
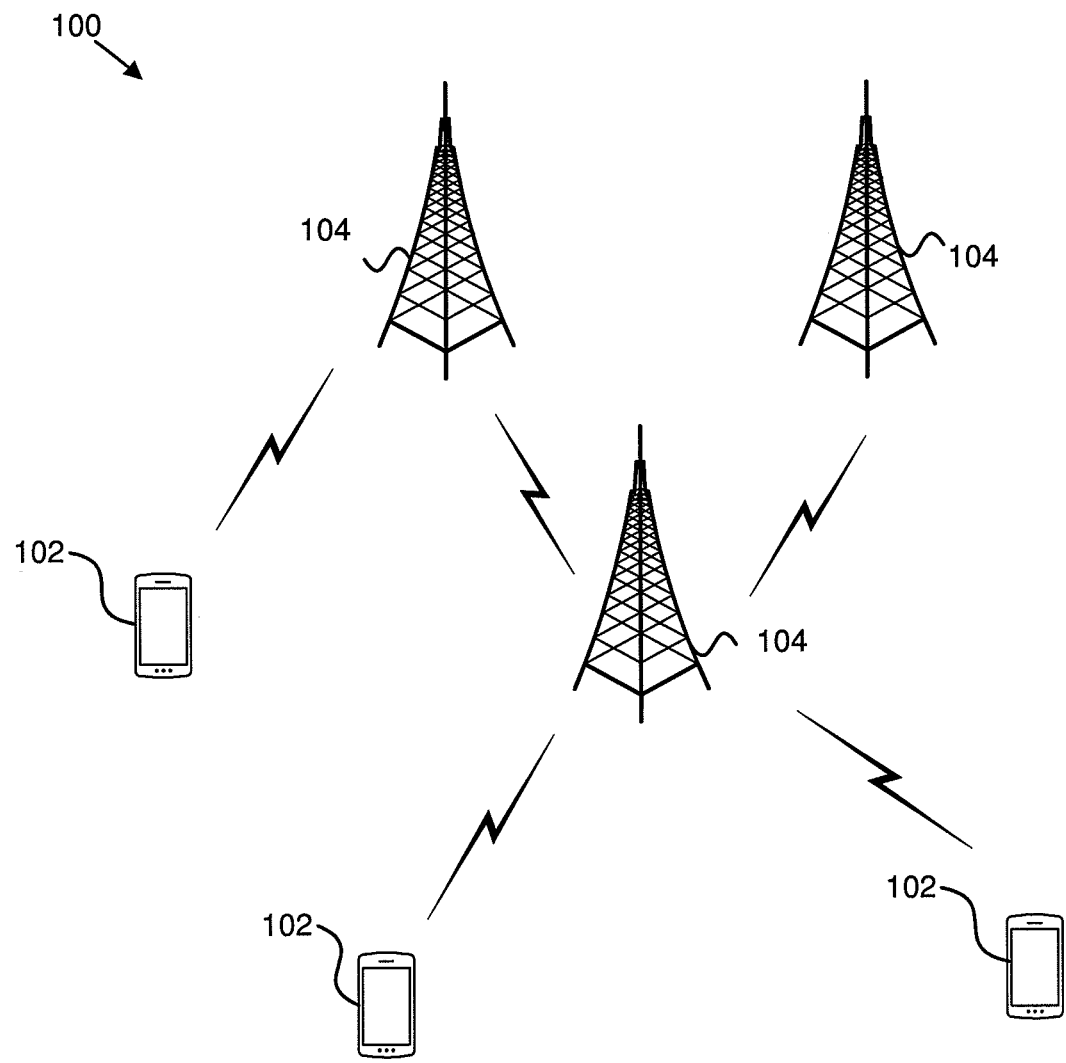
FIG. 1 is a schematic block diagram illustrating one embodiment of a wireless communication system for transmitting and/or receiving feedback.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmitting and/or receiving feedback. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, a core network, an aerial server, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may receive multiple data blocks. In certain embodiments, the remote unit 102 may transmit a feedback message in a time slot. In such embodiments, the feedback message corresponds to the multiple data blocks. In various embodiments, the feedback message includes: a sequence of a sequence set, wherein the sequence indicates feedback information, and the feedback information corresponds to the multiple data blocks; multiple sequences of a sequence set, wherein each sequence of the multiple sequences indicates feedback information, and the feedback information corresponds to one data block of the multiple data blocks; a sequence of a sequence set in a physical resource of a physical resource set, wherein the sequence and the physical resource indicate feedback information, and the feedback information corresponds to the multiple data blocks; and/or multiple sequences of a sequence set in a physical resource of a physical resource set, wherein the multiple sequences and the physical resource indicate feedback information, and the feedback information corresponds to the multiple data blocks. Accordingly, a remote unit 102 may be used for transmitting feedback.

In one embodiment, a base unit 104 may transmit multiple data blocks. In certain embodiments, the base unit 104 receives a feedback message in a time slot. In such embodiments, the feedback message corresponds to the multiple data blocks. In various embodiments, the feedback message includes: a sequence of a sequence set, wherein the sequence indicates feedback information, and the feedback information corresponds to the multiple data blocks; multiple sequences of a sequence set, wherein each sequence of the multiple sequences indicates feedback information, and the feedback information corresponds to one data block of the multiple data blocks; a sequence of a sequence set in a physical resource of a physical resource set, wherein the sequence and the physical resource indicate feedback information, and the feedback information corresponds to the multiple data blocks; and/or multiple sequences of a sequence set in a physical resource of a physical resource set, wherein the multiple sequences and the physical resource indicate feedback information, and the feedback information corresponds to the multiple data blocks. Accordingly, a base unit 104 may be used for receiving feedback.

Figure 2:
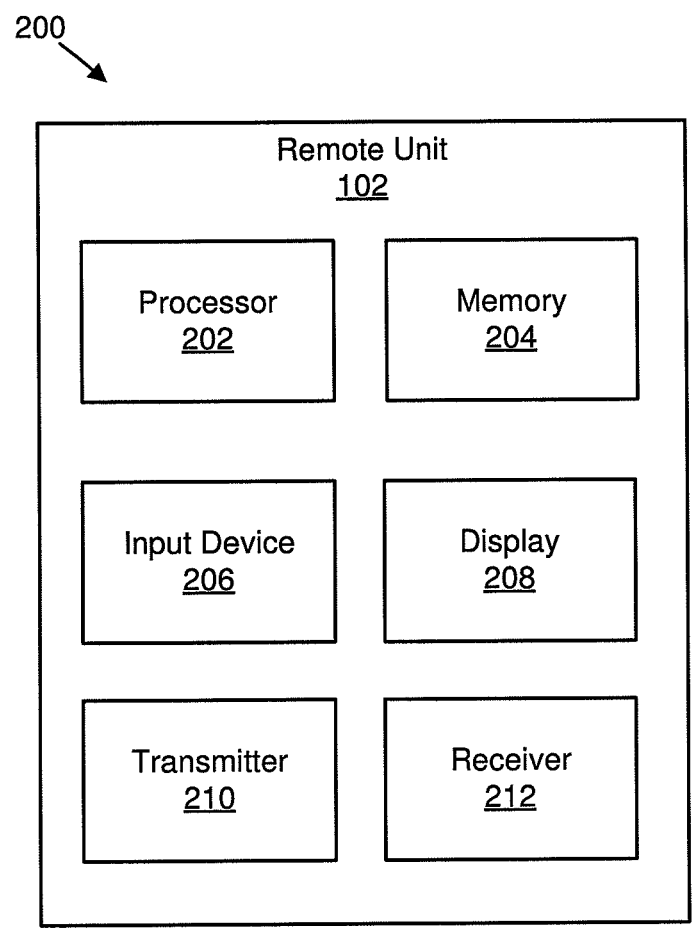
FIG. 2 is a schematic block diagram illustrating one embodiment of an apparatus that may be used for transmitting feedback.

FIG. 2 depicts one embodiment of an apparatus 200 that may be used for transmitting feedback. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In certain embodiments, the receiver 212 receives multiple data blocks. In various embodiments, the transmitter 210 may transmit a feedback message in a time slot. In such embodiments, the feedback message corresponds to the multiple data blocks. In various embodiments, the feedback message includes: a sequence of a sequence set, wherein the sequence indicates feedback information, and the feedback information corresponds to the multiple data blocks; multiple sequences of a sequence set, wherein each sequence of the multiple sequences indicates feedback information, and the feedback information corresponds to one data block of the multiple data blocks; a sequence of a sequence set in a physical resource of a physical resource set, wherein the sequence and the physical resource indicate feedback information, and the feedback information corresponds to the multiple data blocks; and/or multiple sequences of a sequence set in a physical resource of a physical resource set, wherein the multiple sequences and the physical resource indicate feedback information, and the feedback information corresponds to the multiple data blocks. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
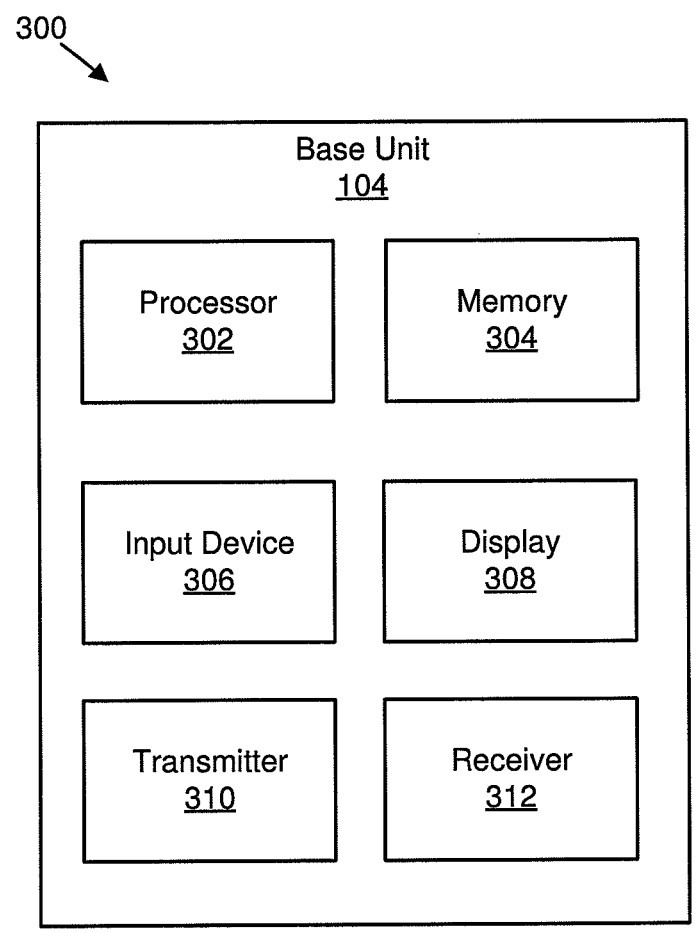
FIG. 3 is a schematic block diagram illustrating one embodiment of an apparatus that may be used for receiving feedback.

FIG. 3 depicts one embodiment of an apparatus 300 that may be used for receiving feedback. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 210 may transmit multiple data blocks. In various embodiments, the receiver 212 may receive a feedback message in a time slot. In such embodiments, the feedback message corresponds to the multiple data blocks. In various embodiments, the feedback message includes: a sequence of a sequence set, wherein the sequence indicates feedback information, and the feedback information corresponds to the multiple data blocks; multiple sequences of a sequence set, wherein each sequence of the multiple sequences indicates feedback information, and the feedback information corresponds to one data block of the multiple data blocks; a sequence of a sequence set in a physical resource of a physical resource set, wherein the sequence and the physical resource indicate feedback information, and the feedback information corresponds to the multiple data blocks; and/or multiple sequences of a sequence set in a physical resource of a physical resource set, wherein the multiple sequences and the physical resource indicate feedback information, and the feedback information corresponds to the multiple data blocks. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
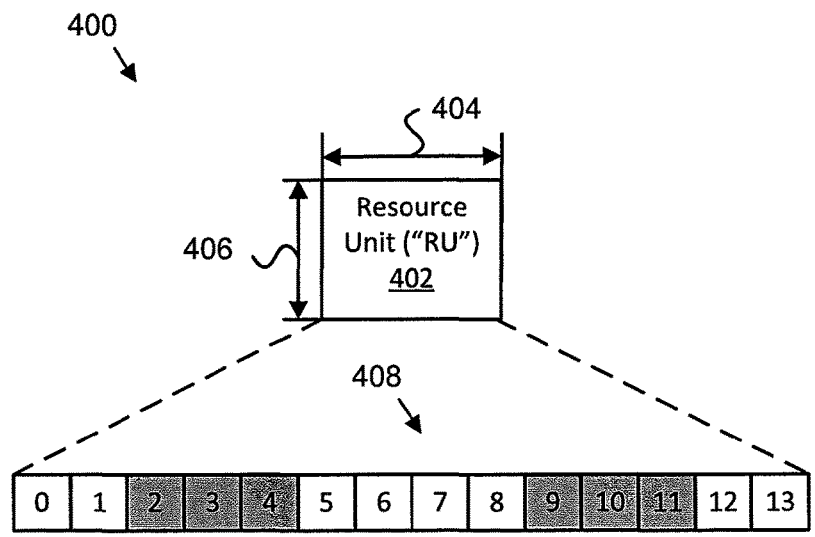
FIG. 4 is a schematic block diagram illustrating one embodiment of a resource unit for transmitting and/or receiving feedback.

FIG. 4 is a schematic block diagram 400 illustrating one embodiment of a resource unit 402 for transmitting and/or receiving feedback. In certain embodiments, the resource unit ("RU") 402 may have a duration 404 of 1 ms with a subcarrier spacing 406 of 15 kHz, and use a single tone (e.g., other embodiments may use multiple tones). In such embodiments, the duration 404 of 1 ms may be shorter than a 2 ms duration used in other embodiments. By having a duration 404 of 1 ms, the RU 402 may be used with any LTE TDD configuration.

In other embodiments, the RU 402 may have a duration 404 of 2 ms and a subcarrier spacing 406 of 3.75 kHz. In such embodiments, the duration 404 of 2 ms may be shorter than an 8 ms duration used in other embodiments. By having a duration 404 of 2 ms, the RU 402 may be used with any LTE TDD configuration having 2 consecutive UL subframes.

In one embodiment, the RU 402 may include multiple symbols 408 (e.g., OFDM symbols) that include a BPSK repetition coding sequence (e.g., symbols 0, 1, 5, 6, 7, 8, 12, and 13) used for HARQ-ACK feedback information transmission and DMRS symbols (e.g., symbols 2, 3, 4, 9, 10, and 11). Moreover, the BPSK repetition coding sequence may include any suitable number of symbols (e.g., 8 symbols), but may be less than 16 symbols used in other embodiments. In various embodiments, a number of repetitions included in the BPSK repetition coding sequence may be configured by RRC signaling. In some embodiments, because the RU 402 may have a shorter duration 404 than in other embodiments, the number of repetitions included in the BPSK repetition coding sequence may be increased. In various embodiments, multiple RUs 402 that are transmitted may use the same frequency (e.g., tones). In such embodiments, cross channel estimation may be used between RUs 402.

Figure 5:
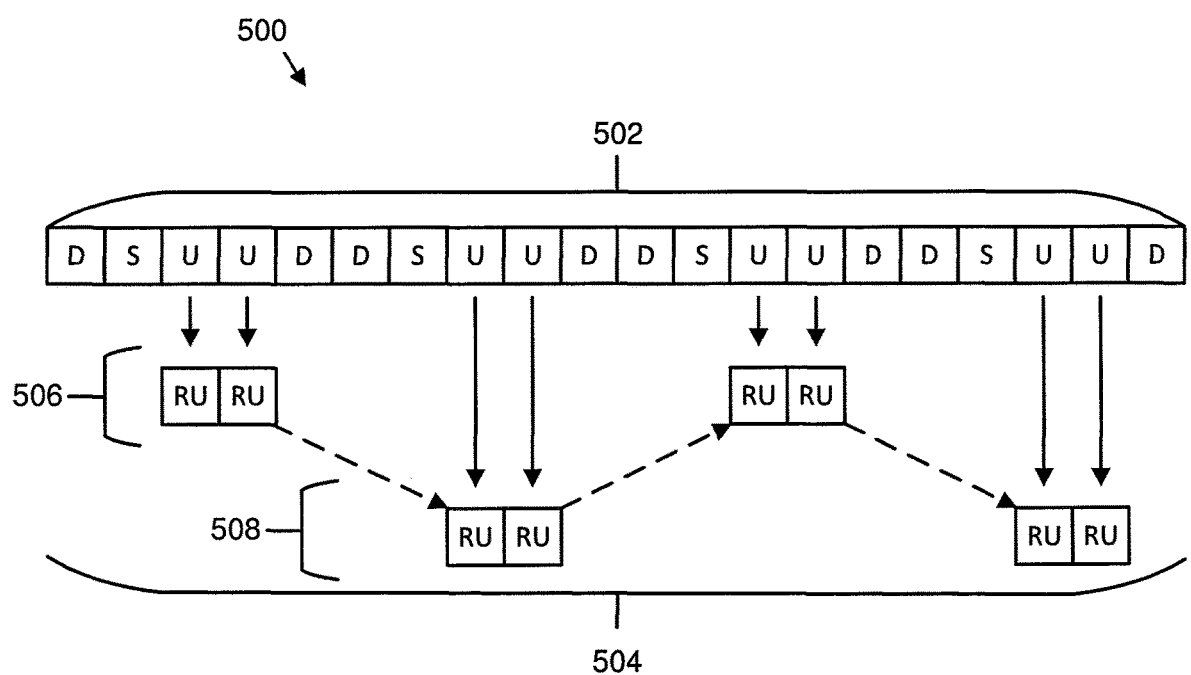
FIG. 5 is a schematic block diagram illustrating one embodiment of transmitting and/or receiving feedback using tone retuning for a time division duplex mode.

In some embodiments, multiple RUs 402 that are transmitted may use multiple frequencies (e.g., tones), as illustrated in FIG. 5. In such embodiments, the HARQ-ACK may retune to a tone pair for transmission. FIG. 5 is a schematic block diagram 500 illustrating one embodiment of transmitting and/or receiving feedback using tone retuning for a time division duplex mode.

For a TDD configuration 502, alternating tones 504 may be used. Specifically, a repeating alternation between a first tone 506 and a second tone 508 may be used. In some embodiments, an activation of tone retuning and/or a tone pair for transmission may be explicitly indicated in DCI; while in other embodiments, an activation of tone retuning and/or a tone pair for transmission may be implicitly indicated (e.g., determined based on a TDD configuration). In certain embodiments, a tone pair may be indicated (e.g., a tone pair including tone 0 and tone 6, a tone pair including tone 1 and tone 7, etc.) explicitly or implicitly. In various embodiments, retuning between tones may not be necessary due to a long time between UL subframes (e.g., subframes that exceed a coherent time, subframes separated by at least a threshold time duration). For example, for TDD configuration 4, there may be no retuning necessary because the set of UL subframes will use one tone and there is only one set of UL subframes in TDD configuration 4. In some embodiments, retuning between tones may be necessary, such as for TDD configuration 1 because there are two sets of UL subframes in a single frame. In certain embodiments, a tone pair may span more than one carrier configured by a base unit 104. For example, a first tone may be in one carrier and a second tone may be in another carrier.

In various embodiments, HARQ-ACK may be multiplexed and/or bundled together. In a first embodiment, multiple HARQ-ACK may be bundled together as shown by one example illustrated in Table 1. In such an embodiment, multiple HARQ-ACK may be logically combined together (e.g., via an AND logic operation) so that a single combined HARQ-ACK may be transmitted (e.g., via NB-PUSCH format 2). In Table 1, a "1" represents ACK and a "0" represents NACK.

TABLE 1

| First HARQ-ACK | Second HARQ-ACK | Combined HARQ-ACK |
|---|---|---|
| 1 | 1 | 1 |
| 1 | 0 | 0 |
| 0 | 1 | 0 |
| 0 | 0 | 0 |

Figure 6:
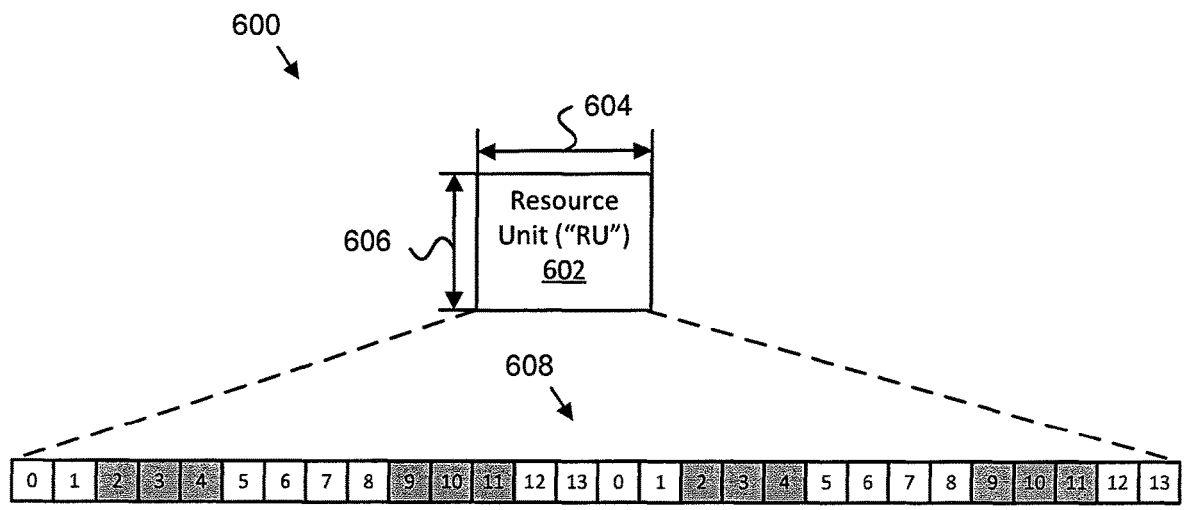
FIG. 6 is a schematic block diagram illustrating another embodiment of a resource unit for transmitting and/or receiving feedback.

In a second embodiment, multiple HARQ-ACK may be multiplexed together using a RU as illustrated in FIG. 6. For example, in one embodiment, a QPSK repetition coding sequence may be used instead of a BPSK repetition coding sequence in order to convey two HARQ-ACK feedback information. In embodiments in which multiple HARQ-ACK are to be transmitted in the same resource, the HARQ-ACK transmission resource may be indicated by DCI. Moreover, a sequence corresponding to the multiple HARQ-ACK may be transmitted in the resource indicated. In certain embodiments, a base unit 104 may schedule a PDSCH process 0 transmitted in a subframe n and a related HARQ-ACK resource in a physical resource M (e.g., subframe n+k, tone 1), and may schedule a PDSCH process 1 transmitted in a subframe n+1 and a related HARQ-ACK resource in the same physical resource M. Moreover, in a subframe n+k and tone 1, a remote unit 102 may transmit a sequence corresponding to a multiplexed HARQ-ACK. One embodiment of possible sequences is illustrated in Table 2. The sequences A, B, C, and D illustrated in Table 2 are QPSK repetition coding sequences. In Table 2, a "1" represents ACK and a "0" represents NACK.

TABLE 2

| First HARQ-ACK (corresponding to PDSCH process 0) | Second HARQ-ACK (corresponding to PDSCH process 1) | Sequence |
|---|---|---|
| 0 | 0 | A |
| 0 | 1 | B |
| 1 | 0 | C |
| 1 | 1 | D |

FIG. 6 is a schematic block diagram 600 illustrating another embodiment of a resource unit 602 for transmitting and/or receiving feedback. In certain embodiments, the resource unit ("RU") 602 may have a duration 604 of 2 ms, a subcarrier spacing 606 of 15 kHz, and use a single tone. In one embodiment, the RU 602 may include multiple symbols 608 (e.g., OFDM symbols) that include a repetition coding sequence (e.g., symbols 0, 1, 5, 6, 7, 8, 12, and 13 in two frames) used for HARQ-ACK and DMRS symbols (e.g., symbols 2, 3, 4, 9, 10, and 11 in two frames). Accordingly, the repetition coding sequence may include 16 symbols.

Figure 7:
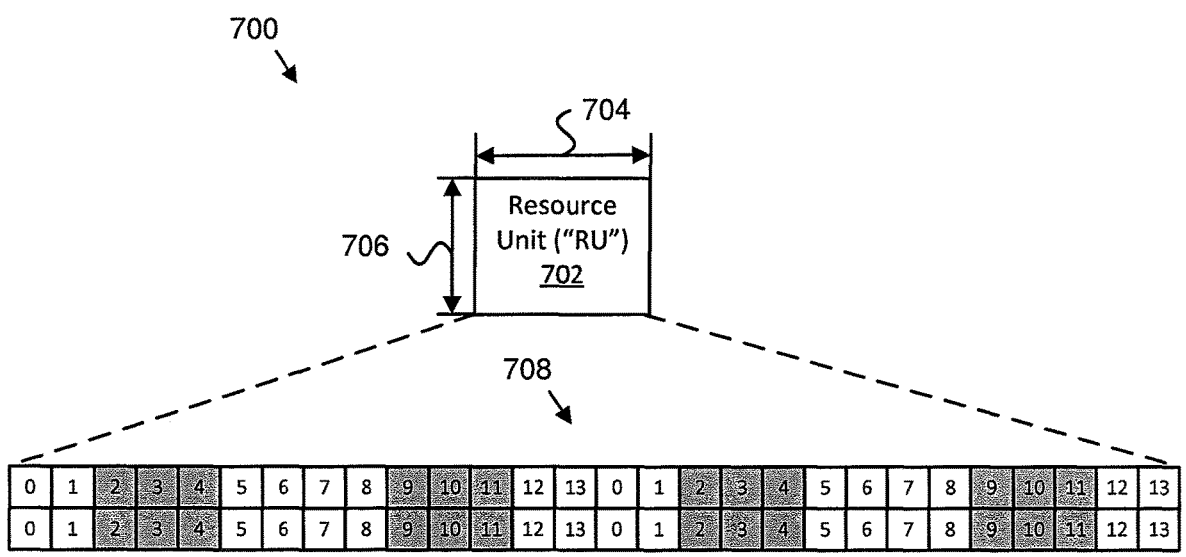
FIG. 7 is a schematic block diagram illustrating a further embodiment of a resource unit for transmitting and/or receiving feedback.

In a third embodiment, multiple HARQ-ACK may be multiplexed together using multiple tone based sequences using a RU as illustrated in FIG. 7. For example, in one embodiment, first and second tone based sequences may be used in order to convey two HARQ-ACK. In certain embodiments, a base unit 104 may schedule a PDSCH process 0 transmitted in a subframe n and a related HARQ-ACK resource in a physical resource M (e.g., subframe n+k, tone 1), and may schedule a PDSCH process 1 transmitted in a subframe n+1 and a related HARQ-ACK resource in a physical resource N (e.g., subframe n+k, tone l+1). Moreover, in a subframe n+k and tones 1 and l+1, a remote unit 102 may transmit two tone based repetition coding sequences (e.g., DFTS-OFDM) to transmit two HARQ-ACK feedback information.

FIG. 7 is a schematic block diagram 700 illustrating a further embodiment of a resource unit 702 for transmitting and/or receiving feedback. In certain embodiments, the resource unit ("RU") 702 may have a duration 704 of 2 ms, a subcarrier spacing 706 of 15 kHz, and use multiple tones. In one embodiment, the RU 702 may include multiple symbols 708 (e.g., OFDM symbols) that include a BPSK repetition coding sequence (e.g., symbols 0, 1, 5, 6, 7, 8, 12, and 13 in two frames) used for HARQ-ACK and DMRS symbols (e.g., symbols 2, 3, 4, 9, 10, and 11 in two frames). Accordingly, the BPSK repetition coding sequence may include 16 symbols. The first BPSK repetition coding sequence may use a first tone sequence, and the second BPSK repetition coding sequence may use a second tone sequence.

In a fourth embodiment, multiple HARQ-ACK may be multiplexed together using multiple sequences and multiple tones (e.g., to convey multiple HARQ-ACK) using a RU as illustrated in FIG. 7. For example, in one embodiment, first and second tones and first and second sequences may be used in order to convey two HARQ-ACK. In certain embodiments, a base unit 104 may schedule a PDSCH process 0 transmitted in a subframe n and a related HARQ-ACK resource in a physical resource M (e.g., subframe n+k, tone l), and may schedule a PDSCH process 1 transmitted in a subframe n+1 and a related HARQ-ACK resource in a physical resource N (e.g., subframe n+k, tone l+1). Moreover, in subframe n+k, multiple sequences may be used. Tables 3 and 4 illustrate different examples of the fourth embodiment. The sequence 1 and sequence 2 in Tables 3 and 4 may use a BPSK repetition coding sequence

TABLE 3

| First HARQ-ACK | Second HARQ-ACK | Sequence | Physical Resource |
|---|---|---|---|
| ACK | ACK | Sequence 1 | Subframe n + k, tone l |
| ACK | NACK | Sequence 2 | Subframe n + k, tone l |
| NACK | ACK | Sequence 1 | Subframe n + k, tone l + 1 |
| NACK | NACK | Sequence 2 | Subframe n + k, tone l + 1 |

TABLE 4

| First HARQ-ACK | Second HARQ-ACK | Sequence | Physical Resource |
|---|---|---|---|
| ACK | ACK | Sequence 1 | First Frequency |
| ACK | NACK | Sequence 1 | Second Frequency |
| NACK | ACK | Sequence 2 | First Frequency |
| NACK | NACK | Sequence 2 | Second Frequency |

Figure 8:
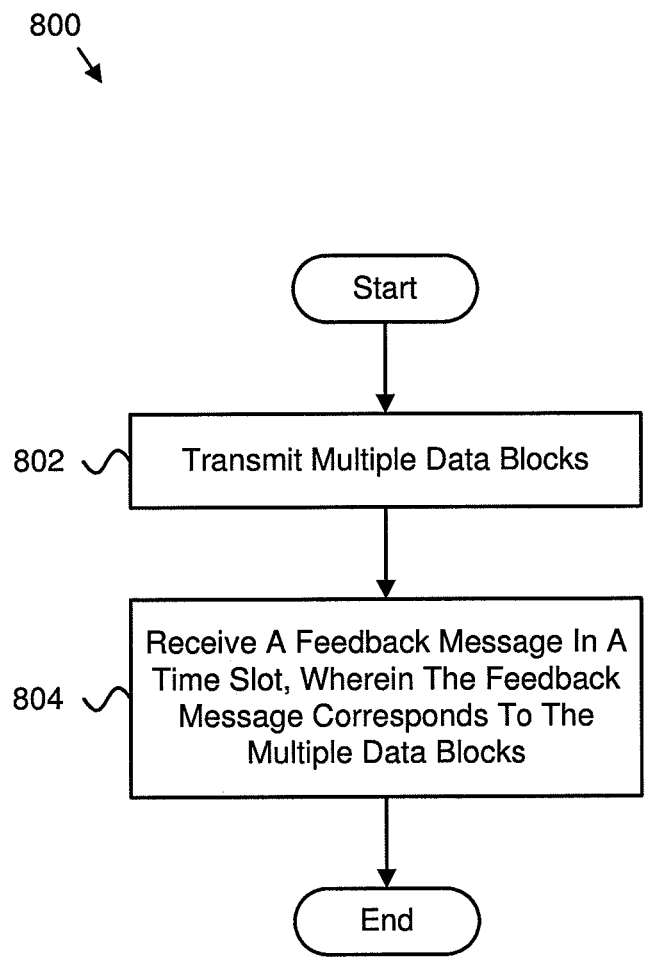
FIG. 8 is a schematic flow chart diagram illustrating one embodiment of a method for receiving feedback.

FIG. 8 is a schematic flow chart diagram illustrating one embodiment of a method 800 for receiving feedback. In some embodiments, the method 800 is performed by an apparatus, such as the base unit 104. In certain embodiments, the method 800 may be performed by a processor executing program code, for example, a microcontroller, a microprocessor, a CPU, a GPU, an auxiliary processing unit, a FPGA, or the like.

The method 800 may include transmitting 802 multiple data blocks. In certain embodiments, the method 800 includes receiving 804 a feedback message in a time slot. In such embodiments, the feedback message corresponds to the multiple data blocks. In various embodiments, the feedback message includes: a sequence of a sequence set, wherein the sequence indicates feedback information, and the feedback information corresponds to the multiple data blocks; multiple sequences of a sequence set, wherein each sequence of the multiple sequences indicates feedback information, and the feedback information corresponds to one data block of the multiple data blocks; a sequence of a sequence set in a physical resource of a physical resource set, wherein the sequence and the physical resource indicate feedback information, and the feedback information corresponds to the multiple data blocks; and/or multiple sequences of a sequence set in a physical resource of a physical resource set, wherein the multiple sequences and the physical resource indicate feedback information, and the feedback information corresponds to the multiple data blocks.

In one embodiment, the feedback message includes a sequence of a sequence set, the sequence indicates feedback information, and the feedback information corresponds to the multiple data blocks. In a further embodiment, the sequence set is selected from a group including a binary phase shift keying sequence set, a quadrature phase shift keying sequence set, and a Hadamard sequence set. In certain embodiments, receiving the feedback message includes receiving the feedback message via a single frequency tone, a single frequency pattern, and/or a single frequency waveform.

In some embodiments, the feedback message includes multiple sequences of a sequence set, each sequence of the multiple sequences indicates feedback information, and the feedback information corresponds to one data block of the multiple data blocks. In various embodiments, the sequence set is selected from a group including a binary phase shift keying sequence set, a quadrature phase shift keying sequence set, and a Hadamard sequence set. In certain embodiments, receiving the feedback message includes receiving the feedback message via multiple frequency tones, multiple frequency patterns, and/or multiple frequency waveforms.

In one embodiment, the feedback message includes a sequence of a sequence set in a physical resource of a physical resource set, the sequence and the physical resource indicate feedback information, and the feedback information corresponds to the multiple data blocks. In a further embodiment, the sequence set is selected from a group including a binary phase shift keying sequence set, a quadrature phase shift keying sequence set, and a Hadamard sequence set. In certain embodiments, receiving the feedback message includes receiving the feedback message via a single frequency tone, a single frequency pattern, and/or a single frequency waveform.

In some embodiments, the feedback message includes multiple sequences of a sequence set in a physical resource of a physical resource set, the multiple sequences and the physical resource indicate feedback information, and the feedback information corresponds to the multiple data blocks. In various embodiments, the sequence set is selected from a group including a binary phase shift keying sequence set, a quadrature phase shift keying sequence set, and a Hadamard sequence set. In certain embodiments, receiving the feedback message includes receiving the feedback message via multiple frequency tones, multiple frequency patterns, and/or multiple frequency waveforms.

Figure 9:
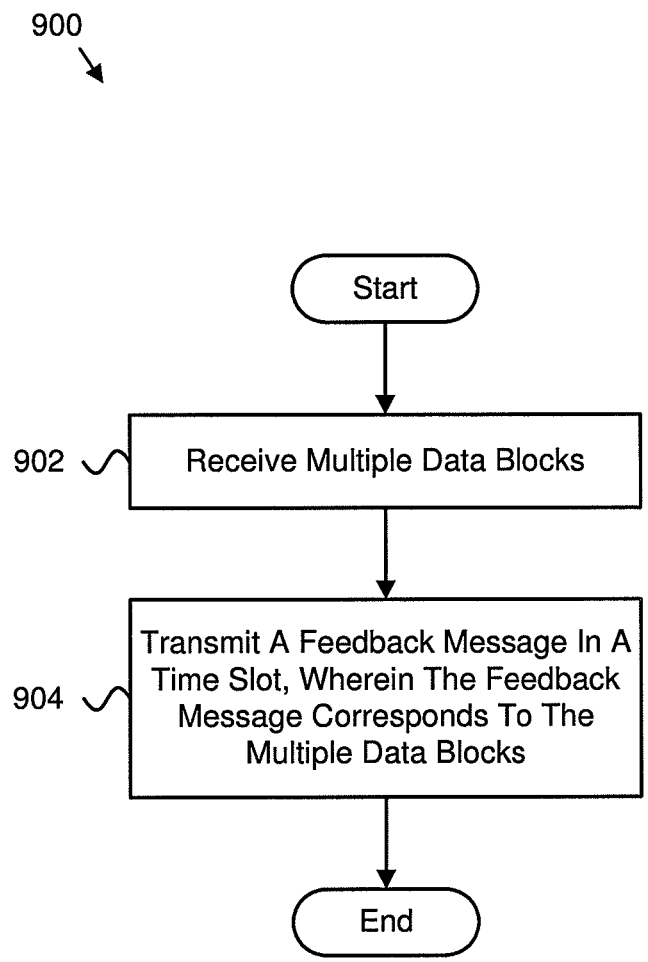
FIG. 9 is a schematic flow chart diagram illustrating one embodiment of a method for transmitting feedback.

FIG. 9 is a schematic flow chart diagram illustrating one embodiment of a method 900 for transmitting feedback. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include receiving 902 multiple data blocks. In various embodiments, the method 900 may also include transmitting 904 a feedback message in a time slot. In such embodiments, the feedback message corresponds to the multiple data blocks. In various embodiments, the feedback message includes: a sequence of a sequence set, wherein the sequence indicates feedback information, and the feedback information corresponds to the multiple data blocks; multiple sequences of a sequence set, wherein each sequence of the multiple sequences indicates feedback information, and the feedback information corresponds to one data block of the multiple data blocks; a sequence of a sequence set in a physical resource of a physical resource set, wherein the sequence and the physical resource indicate feedback information, and the feedback information corresponds to the multiple data blocks; and/or multiple sequences of a sequence set in a physical resource of a physical resource set, wherein the multiple sequences and the physical resource indicate feedback information, and the feedback information corresponds to the multiple data blocks.

In one embodiment, the feedback message includes a sequence of a sequence set, the sequence indicates feedback information, and the feedback information corresponds to the multiple data blocks. In a further embodiment, the sequence set is selected from a group including a binary phase shift keying sequence set, a quadrature phase shift keying sequence set, and a Hadamard sequence set. In certain embodiments, transmitting the feedback message includes transmitting the feedback message via a single frequency tone, a single frequency pattern, and/or a single frequency waveform.

In some embodiments, the feedback message includes multiple sequences of a sequence set, each sequence of the multiple sequences indicates feedback information, and the feedback information corresponds to one data block of the multiple data blocks. In various embodiments, the sequence set is selected from a group including a binary phase shift keying sequence set, a quadrature phase shift keying sequence set, and a Hadamard sequence set. In certain embodiments, transmitting the feedback message includes transmitting the feedback message via multiple frequency tones, multiple frequency patterns, and/or multiple frequency waveforms.

In one embodiment, the feedback message includes a sequence of a sequence set in a physical resource of a physical resource set, the sequence and the physical resource indicate feedback information, and the feedback information corresponds to the multiple data blocks. In a further embodiment, the sequence set is selected from a group including a binary phase shift keying sequence set, a quadrature phase shift keying sequence set, and a Hadamard sequence set. In certain embodiments, transmitting the feedback message includes transmitting the feedback message via a single frequency tone, a single frequency pattern, and/or a single frequency waveform.

In some embodiments, the feedback message includes multiple sequences of a sequence set in a physical resource of a physical resource set, the multiple sequences and the physical resource indicate feedback information, and the feedback information corresponds to the multiple data blocks. In various embodiments, the sequence set is selected from a group including a binary phase shift keying sequence set, a quadrature phase shift keying sequence set, and a Hadamard sequence set. In certain embodiments, transmitting the feedback message includes transmitting the feedback message via multiple frequency tones, multiple frequency patterns, and/or multiple frequency waveforms.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   transmitting a plurality of data blocks; and
   receiving a feedback message in a time slot, wherein the feedback message corresponds to the plurality of data blocks, and the feedback message comprises:
   a sequence of a sequence set, wherein the sequence indicates feedback information, the feedback information corresponds to the plurality of data blocks, and the sequence is multiplexed with demodulation reference signal symbols in a time domain;
   a plurality of sequences of a sequence set, wherein each sequence of the plurality of sequences indicates feedback information, the feedback information corresponds to one data block of the plurality of data blocks, and each sequence of the plurality of sequences is multiplexed with demodulation reference signal symbols in the time domain;
   a sequence of a sequence set in a physical resource of a physical resource set, wherein the sequence and the physical resource indicate feedback information, the feedback information corresponds to the plurality of data blocks, and the sequence is multiplexed with demodulation reference signal symbols in the dime domain;
   a plurality of sequences of a sequence set in a physical resource of a physical resource set, wherein the plurality of sequences and the physical resource indicate feedback information, the feedback information corresponds to the plurality of data blocks, and each sequence of the plurality of sequences is multiplexed with demodulation reference signal symbols in the time domain; or
   some combination thereof, wherein the sequence set is selected from a group comprising a binary phase shift keying sequence set, a quadrature phase shift keying sequence set, and a Hadamard sequence set, the binary phase shift keying sequence set comprises a plurality of different binary phase shift keying sequences, and the quadrature phase shift keying sequence set comprises a plurality of different quadrature phase shift keying sequences.

2. The method of claim 1, wherein the feedback message comprises a sequence of a sequence set, the sequence indicates feedback information, and the feedback information corresponds to the plurality of data blocks.

3. The method of claim 2, wherein receiving the feedback message comprises receiving the feedback message via a single frequency tone, a single frequency pattern, a single frequency waveform, or some combination thereof.

4. The method of claim 1, wherein the feedback message comprises a plurality of sequences of a sequence set, each sequence of the plurality of sequences indicates feedback information, and the feedback information corresponds to one data block of the plurality of data blocks.

5. The method of claim 4, wherein receiving the feedback message comprises receiving the feedback message via a plurality of frequency tones, a plurality of frequency patterns, a plurality of frequency waveforms, or some combination thereof.

6. The method of claim 1, wherein the feedback message comprises a sequence of a sequence set in a physical resource of a physical resource set, the sequence and the physical resource indicate feedback information, and the feedback information corresponds to the plurality of data blocks.

7. The method of claim 6, wherein receiving the feedback message comprises receiving the feedback message via a single frequency tone, a single frequency pattern, a single frequency waveform, or some combination thereof.

8. The method of claim 1, wherein the feedback message comprises a plurality of sequences of a sequence set in a physical resource of a physical resource set, the plurality of sequences and the physical resource indicate feedback information, and the feedback information corresponds to the plurality of data blocks.

9. The method of claim 8, wherein receiving the feedback message comprises receiving the feedback message via a plurality of frequency tones, a plurality of frequency patterns, a plurality of frequency waveforms, or some combination thereof.

10. An apparatus comprising:
    a transmitter that transmits a plurality of data blocks; and
    a receiver that receives a feedback message in a time slot, wherein the feedback message corresponds to the plurality of data blocks, and the feedback message comprises:
    a sequence of a sequence set, wherein the sequence indicates feedback information, the feedback information corresponds to the plurality of data blocks, and the sequence is multiplexed with demodulation reference signal symbols in a time domain;
    a plurality of sequences of a sequence set, wherein each sequence of the plurality of sequences indicates feedback information, the feedback information corresponds to one data block of the plurality of data blocks, and each sequence of the plurality of sequences is multiplexed with demodulation reference signal symbols in the time domain;
    a sequence of a sequence set in a physical resource of a physical resource set, wherein the sequence and the physical resource indicate feedback information, the feedback information corresponds to the plurality of data blocks, and the sequence is multiplexed with demodulation reference signal symbols in the dime domain;
    a plurality of sequences of a sequence set in a physical resource of a physical resource set, wherein the plurality of sequences and the physical resource indicate feedback information, the feedback information corresponds to the plurality of data blocks, and each sequence of the plurality of sequences is multiplexed with demodulation reference signal symbols in the time domain; or
    some combination thereof, wherein the sequence set is selected from a group comprising a binary phase shift keying sequence set, a quadrature phase shift keying sequence set, and a Hadamard sequence set, the binary phase shift keying sequence set comprises a plurality of different binary phase shift keying sequences, and the quadrature phase shift keying sequence set comprises a plurality of different quadrature phase shift keying sequences.

11. A method comprising:
receiving a plurality of data blocks; and
transmitting a feedback message in a time slot, wherein the feedback message corresponds to the plurality of data blocks, and the feedback message comprises:
a sequence of a sequence set, wherein the sequence indicates feedback information, the feedback information corresponds to the plurality of data blocks, and the sequence is multiplexed with demodulation reference signal symbols in a time domain;
a plurality of sequences of a sequence set, wherein each sequence of the plurality of sequences indicates feedback information, the feedback information corresponds to one data block of the plurality of data blocks, and each sequence of the plurality of sequences is multiplexed with demodulation reference signal symbols in the time domain;
a sequence of a sequence set in a physical resource of a physical resource set, wherein the sequence and the physical resource indicate feedback information, the feedback information corresponds to the plurality of data blocks, and the sequence is multiplexed with demodulation reference signal symbols in the dime domain;
a plurality of sequences of a sequence set in a physical resource of a physical resource set, wherein the plurality of sequences and the physical resource indicate feedback information, the feedback information corresponds to the plurality of data blocks, and each sequence of the plurality of sequences is multiplexed with demodulation reference signal symbols in the time domain; or
some combination thereof, wherein the sequence set is selected from a group comprising a binary phase shift keying sequence set, a quadrature phase shift keying sequence set, and a Hadamard sequence set, the binary phase shift keying sequence set comprises a plurality of different binary phase shift keying sequences, and the quadrature phase shift keying sequence set comprises a plurality of different quadrature phase shift keying sequences.

12. The method of claim 11, wherein the feedback message comprises a sequence of a sequence set, the sequence indicates feedback information, and the feedback information corresponds to the plurality of data blocks.

13. The method of claim 11, wherein the feedback message comprises a plurality of sequences of a sequence set, each sequence of the plurality of sequences indicates feedback information, and the feedback information corresponds to one data block of the plurality of data blocks.

14. The method of claim 11, wherein the feedback message comprises a sequence of a sequence set in a physical resource of a physical resource set, the sequence and the physical resource indicate feedback information, and the feedback information corresponds to the plurality of data blocks.

15. The method of claim 11, wherein the feedback message comprises a plurality of sequences of a sequence set in a physical resource of a physical resource set, the plurality of sequences and the physical resource indicate feedback information, and the feedback information corresponds to the plurality of data blocks.

16. An apparatus comprising:
a receiver that receives a plurality of data blocks; and
a transmitter that transmits a feedback message in a time slot, wherein the feedback message corresponds to the plurality of data blocks, and the feedback message comprises:
a sequence of a sequence set, wherein the sequence indicates feedback information, the feedback information corresponds to the plurality of data blocks, and the sequence is multiplexed with demodulation reference signal symbols in a time domain;
a plurality of sequences of a sequence set, wherein each sequence of the plurality of sequences indicates feedback information, the feedback information corresponds to one data block of the plurality of data blocks, and each sequence of the plurality of sequences is multiplexed with demodulation reference signal symbols in the time domain;
a sequence of a sequence set in a physical resource of a physical resource set, wherein the sequence and the physical resource indicate feedback information, the feedback information corresponds to the plurality of data blocks, and the sequence is multiplexed with demodulation reference signal symbols in the dime domain;
a plurality of sequences of a sequence set in a physical resource of a physical resource set, wherein the plurality of sequences and the physical resource indicate feedback information, the feedback information corresponds to the plurality of data blocks, and each sequence of the plurality of sequences is multiplexed with demodulation reference signal symbols in the time domain; or
some combination thereof, wherein the sequence set is selected from a group comprising a binary phase shift keying sequence set, a quadrature phase shift keying sequence set, and a Hadamard sequence set, the binary phase shift keying sequence set comprises a plurality of different binary phase shift keying sequences, and the quadrature phase shift keying sequence set comprises a plurality of different quadrature phase shift keying sequences.

* * * * *